No. 724,129. PATENTED MAR. 31, 1903.
G. H. F. SCHRADER.
METHOD OF FERRULING HOSE AND PRODUCT THEREOF.
APPLICATION FILED MAR. 27, 1902.
NO MODEL.
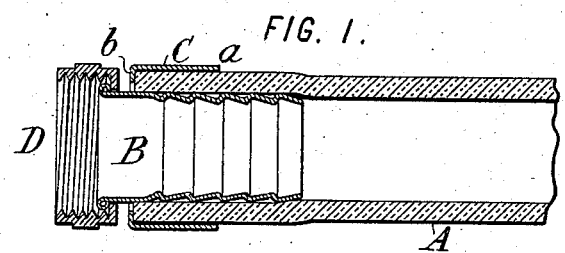
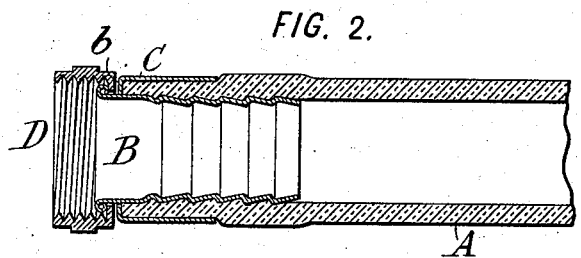
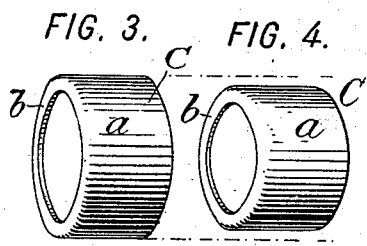
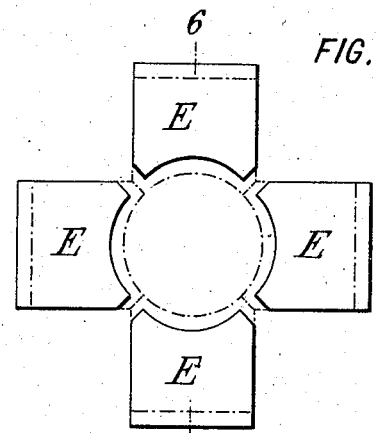
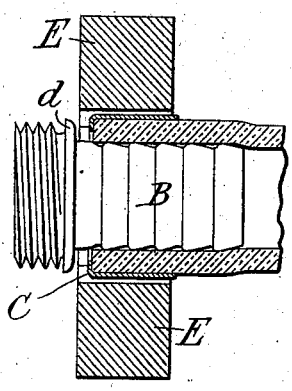
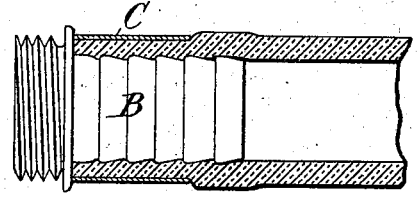
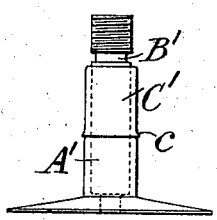
INVENTOR:
George H. F. Schrader
By Attorneys,
WITNESSES:

UNITED STATES PATENT OFFICE.

GEORGE H. F. SCHRADER, OF NEW YORK, N. Y.

METHOD OF FERRULING HOSE AND PRODUCT THEREOF.

SPECIFICATION forming part of Letters Patent No. 724,129, dated March 31, 1903.

Application filed March 27, 1902. Serial No. 100,339. (No model.)

*To all whom it may concern:*

Be it known that I, GEORGE H. F. SCHRADER, a citizen of the United States, residing in the borough of Manhattan, city, county, and State of New York, have invented a certain new and useful Improved Method of Ferruling Hose and Products Thereof, of which the following is a specification.

This invention relates to a method of applying a ferrule to the end portion of a rubber or other compressible hose or tube—such, for example, as a garden-hose, flexible rubber tubing, &c. Such a ferrule has two functions, one being to make a presentable finish for the end of the tube, its other and more important function being to hold the tube compressed upon some internal part, usually tubular, and which I will designate generically as a "core." This core is most commonly the shank or nipple of a coupling or the body of a valve. By compressing the hose or tube tightly against such core the latter is held firmly confined within the hose. Heretofore it has been customary to compress a hose or tube upon such a core by various means, such as by a rigid collar forced endwise upon the hose, or by placing a collar or ferrule over the hose and afterward forcing the core into the hose so as to expand the latter to fill the ferrule, or by putting a band or clamp around the hose and drawing it together by one or more screws, or by placing a ring or collar around the hose and crimping or corrugating it usually at two or four points equidistantly around the circumference, whereby the hose is compressed within it, or by putting a ferrule around the hose and crimping a narrow circumferential bead in it to indent the hose circumferentially.
It has also been proposed to make a presentable outer finish for the hose or tube by simply slipping a sheet-metal ferrule over it and without any compression of the hose.

My invention provides an improved, simplified, and cheapened method of ferruling the end of a hose or compressible tube, wherein a sheet-metal ferrule is employed adapted to slip freely over the hose and is thereafter contracted by external pressure in such manner as to force it to a smaller circumference throughout substantially its entire length without corrugating it. The result is a very strong, thin, and light ferrule applied without ridge or seam in such manner as to strongly compress and permanently confine the rubber. My ferrule does not add appreciably to the weight and does not add to the diameter of the hose, is free from corrugations or roughnesses, is quickly and easily applied, and affords a very neat and desirable finish.

In the accompanying drawings, Figure 1 is a longitudinal section of an ordinary gardenhose or the like with part of the coupling applied thereto, showing my ferrule applied upon the hose. Fig. 2 is a similar section showing the ferrule contracted, so as to compress the hose. Fig. 3 shows a perspective view of the ferrule before compression, and Fig. 4 a similar view showing it after compression. Fig. 5 illustrates the pressing operation, being a face view of the compressingjaws. Fig. 6 is a vertical section thereof on the line 6 6 in Fig. 5, showing the ferrule and hose in place. Fig. 7 is an elevation of a bicycle-tire tube and valve with a ferrule applied to the tube according to my invention. Fig. 8 is a section of hose similar to Fig. 2, showing a modification.

I will first describe my invention as applied to any ordinary rubber hose, of which so-called "garden-hose" is an example.

In the drawings, let A designate the hose, B any sort of core thrust into the end thereof, and C a ferrule.

In Figs. 1 and 2 the core B is shown as the tubular shank or nipple of a hose-coupling, of which D is the screw-threaded union. The core, however, may be any part, tubular or solid, which is thrust into the end of the hose.

The ferrule C is of any suitable ductile sheet metal, such as brass, being preferably drawn up into cup form by the usual drawing operation, its outer part *a* being substantially cylindrical, while its inturned flange *b* is preferably plane, or approximately so, in order to cover the otherwise-exposed end of the hose.

The first step in the practice of my invention is to put the parts together in the manner shown in Fig. 1, with the core B inside the hose and the ferrule C outside it. In the case of a hose-coupling where the union D is larger than the opening through the flange $b$ of the ferrule it is necessary to first apply the ferrule and then insert the core; but in some instances the core may be first applied and the ferrule passed over it.

The second step in practicing my invention consists in forcing the ferrule C to a smaller circumference without corrugating it. This operation I term "contracting." It is essential and peculiar to this contracting operation that the cylindrical part $a$ of the ferrule be not corrugated or forced into folds or wrinkles, but that it be subjected to uniform external pressure all around in such manner that its fibers shall be closed together with the effect of reducing it to a cylindrical tube of smaller diameter, but without otherwise perceptibly distorting it or changing its shape, (except in the one detail which I will explain later in referring to the outturned edge or skirt $c$.) This contracting operation may be performed by any suitable tool or machine. It is desirable that there be a plurality of jaws, preferably four or more, movable simultaneously toward and from a common center coincident with the axis of the hose, these jaws engaging substantially the entire circumference of the ferrule and when closed together to contract it, conforming on their inner or working faces to its reduced circumference. As my present application for patent is not directed to the machine for performing the contracting operation, I will not illustrate such machine in detail; but in order that its essential mode of operation may be understood I have shown in Fig. 5 a face view of the jaws, and in Fig. 6 a vertical section thereof. I have here shown four jaws E E, which in full lines are shown separated or expanded, in which position the end of the hose with its ferrule in place is inserted within the jaws to the position shown in Fig. 6. Then by any suitable mechanism the jaws are simultaneously forced toward each other to the position shown in dotted lines in Fig. 5. In this position the jaws meet, there being no room between them for any corrugation of the ferrule. The jaws are then separated in order to release the ferrule, whereupon the hose is withdrawn from the jaws. It is then in the condition shown in Fig. 2—that is to say, the ferrule has been contracted upon the hose so as to pinch the latter between it and the internal core, the end flange $b$ having been forced to a smaller diameter without distorting it. The product of this ferruling operation is a hose the end portion of which is reduced in diameter where it is pinched within the contracted ferrule, the latter presenting a perfectly smooth outer surface and making a neat, presentable, and desirable finish. The absence of any projections, flanges, fastening-screws, ribs, corrugations, or wrinkles is a noteworthy and advantageous feature. The hose may be more tightly squeezed by my method than by any method involving the forcing of a ferrule on endwise or the expanding of the hose by forcing a nipple endwise into it. The compression or pinching of the hose is more uniform than where the ferrule is forced inward in such manner as to cause the surplus sheet metal to expend itself in forming corrugations or ribs.

In order to avoid any liability of the extreme edge of the ferrule cutting the hose, I prefer in squeezing or contracting the ferrule, especially where soft material, such as pure rubber, is used, to give this outer edge a dished, flaring, or trumpet shape, as shown at $c$ in Fig. 7. The outward projection of this edge is not sufficient to be disagreeable in handling the hose, but is just sufficient to enable the hose where released from the pinch of the ferrule to expand in a natural curve, and thereby prevent any cutting or scoring of the hose by the ferrule. To accomplish this, the jaws E E may be slightly rounded or flaring at the outer face.

An important application of my invention is to the rubber tube or cot of a bicycle-tire, where it receives within it the usual air-valve. Heretofore it has been customary to wind this tube with wire after inserting within it the body or shell of the valve suitably coated with cement. My invention accomplishes the same tight connection in a much more sightly and desirable manner and by a much quicker operation. To attain a sightly finish, it has been heretofore proposed to place loosely over the tube after inserting the valve a sheet-metal ferrule held in place by the cap, a construction which gave the desirable external finish, but did not provide for compressing the tube and holding it in tight connection with the inner core or valve-body.

Fig. 7 shows the application of my invention to a bicycle-tire cot, A' being the rubber cot or tube, B' the valve-body which constitutes the core, and C' the ferrule.

It is not strictly essential, although preferable, that the ferrule have an inturned flange $b$. The function of this flange is chiefly to cover the end of the rubber tube or hose, but also to give a rounded finish to the outer end of the ferrule. The former function may be performed by a flange on the core, as shown in Fig. 8, where the core B has a flange $d$, which comes against the end of the hose.

The ferrule of my invention is essentially a cylindrical sheet-metal tube, which in being applied is contracted to a cylindrical sheet-metal tube of smaller diameter. It is to be distinguished from those couplings wherein a sheet-metal lining is contracted conically upon the hose to pinch it at one place only in its length. In this specification I have used the term "hose" to designate any rubber tube or any compressible tube of other material than rubber to which my invention is applicable.

Though I have described with great particularity of detail a method and product embodying my invention, yet it is to be understood that various other forms of the method and product are within the skill of those familiar with this art and may be carried out or produced without departure from my invention. For example, it is understood that the invention includes all processes in which there is no substantial intentional corrugation of the ferrule. When the ferrule is too large to fit the hose properly or when the clamping-jaws are not exactly adjusted to the size of hose and ferrule, it has sometimes occurred that a slight fold in the metal is observed after compression; but this is unintentional and not a necessary incident of the method, but an imperfection which may or may not exist in the product. It is to be understood also that the core referred to is any core whatever within the hose, either rigid or flexible. For example, it may be a solid flexible plug, or it may be the end of another section of hose to be coupled to the first section.

What I claim is—

1. The described mode of ferruling a compressible hose, consisting in placing a sheet-metal ferrule around it and by external pressure contracting it over substantially its entire length to a smaller diameter without corrugating it, and thereby uniformly compressing the hose.

2. The improved mode of applying a ferrule to a compressible hose, consisting in inserting a core thereinto and placing a sheet-metal ferrule over the exterior of the hose against its end, and then by external pressure centripetally applied to nearly the entire exterior surface of the ferrule, contracting the ferrule over substantially its entire length to a smaller diameter without corrugating it, and thereby uniformly compressing the hose against the core.

3. A compressible hose having its end portion uniformly compressed within a non-corrugated sheet-metal ferrule contracted over substantially its entire length.

4. A compressible hose having its end portion uniformly compressed between an internal rigid core and an external non-corrugated sheet-metal ferrule contracted over substantially its entire length.

5. A compressible hose having its end portion uniformly compressed between an internal rigid core and an external non-corrugated sheet-metal ferrule contracted over substantially its entire length and having an inturned end covering the end of the hose.

In witness whereof I have hereunto signed my name in the presence of two subscribing witnesses.

GEORGE H. F. SCHRADER.

Witnesses:
M. CHARLES SCHWEINERT,
ALBERT G. SEARLE.